United States Patent [19]

Sakaki et al.

[11] 4,241,443
[45] Dec. 23, 1980

[54] APPARATUS FOR REDUCING A SAMPLING FREQUENCY

[75] Inventors: Hiroshi Sakaki; Sotokichi Shintani, both of Tokyo, Japan

[73] Assignee: Kokusai Denshin Denwa Co., Ltd., Tokyo, Japan

[21] Appl. No.: 28,824

[22] Filed: Apr. 10, 1979

[30] Foreign Application Priority Data

Apr. 12, 1978 [JP] Japan .................................. 53-42192

[51] Int. Cl.³ ............................................... H04J 1/05
[52] U.S. Cl. ........................................ 370/70; 370/84
[58] Field of Search .......................... 370/70, 84, 118; 179/15.55 R

[56] References Cited

U.S. PATENT DOCUMENTS

| | | | |
|---|---|---|---|
| 3,605,019 | 9/1971 | Cutter | 370/70 |
| 3,912,870 | 10/1975 | Roy | 370/70 |
| 4,001,510 | 1/1977 | Reed | 370/70 |
| 4,021,616 | 5/1977 | Betts | 370/84 |
| 4,131,766 | 12/1978 | Narasimha | 370/70 |

OTHER PUBLICATIONS

*IEEE Transactions on Communications;* vol. Com-22, No. 9; Sep. 1974; "TDM-FDM Transmultiplexer . . . " by Bellanger.
*IEEE Transactions on Communication Technology;* vol. com-19; No. 1; Feb. 1971; "SSB/FDM Utilizing TDM Digital Filters" by Kurta.

*Primary Examiner*—David L. Stewart
*Attorney, Agent, or Firm*—Armstrong, Nikaido, Marmelstein & Kubovcik

[57] ABSTRACT

An apparatus for reducing a sampling frequency which derives information with the bandwidth $f_B/N$ (N is an integer) having a sampling frequency of $2f_B/N$ from an input FDM signal with a bandwidth up to $f_B$ having the sampling frequency $2f_B$ has been found. The present apparatus comprises a pair of partial frequency reduction systems and a switch for alternately selecting the outputs of said partial frequency reduction systems to provide the output signal. Each of said partial frequency reduction systems comprises a DFT means for performing the discrete Fourier transform for every G sampling points (G is the multiple of N) to said input signal, a multiplication means for multiplying the predetermined frequency characteristics with the output of said DFT means, linear conversion means for linear conversion of the output of said multiplication means and for providing G/N number of data, and means for performing the inverse discrete Fourier transform to the output of said linear conversion means. The present invention reduces sampling frequency by performing a smaller number of multiplications than a prior art, thus, the structure of an apparatus can be simple.

2 Claims, 11 Drawing Figures

APPARATUS FOR REDUCING A SAMPLING FREQUENCY

BACKGROUND OF THE INVENTION

The present invention relates to an apparatus for reducing a sampling frequency. The major applications of the present invention are in a trans-multiplexer for converting a frequency-division-multiplexed-signal (FDM) to a pulse-code-modulation-signal (PCM), and carrier-frequency terminal equipment for distributing an FDM signal to each individual channel. According to the present invention, a part of the narrow band signal, for instance, a single channel signal, is derived from a wide band FDM signal with low frequency sampling signals which correspond to said narrow band signal.

A heterodyne frequency conversion system for deriving a single channel signal from an FDM signal is known, and lately, a discrete Fourier transform system for deriving said single channel signal from an FDM signal has been proposed. The present invention relates to an improvement of the discrete Fourier transform system.

According to a prior discrete Fourier transform system for reducing a sampling frequency, for instance, a part of the frequency band of an SSB.FDM signal, is picked up and the sampling frequency is then reduced. In this case, the derived frequency band must be less than half of the reduced sampling pulse frequency. In that system, the restriction of the input signal frequency band is performed by using a digital filter which directly processes the sampled signal on the time axis of the input signal, or by using an another digital filter which processes first the input signal on the frequency axis through the discrete Fourier transform (DFT) and then provides the time axis signal through the inverse discrete Fourier transform (IDFT). The process of the convolution of the input signal and the impulse response of the filter on the time axis is the same as the product of those two signals on the frequency axis.

Accordingly, the periodic convolution or the filtering can be performed by obtaining the product of the input signal and the impulse response on the frequency axis through the discrete Fourier transform (DFT), and providing the time axis signal from said product through the inverse discrete Fourier transform (IDFT).

FIG. 2 shows the convolution of two sampling signals, in which FIG. 2(a) shows the input signal and has G number of pulses (G=21 in the figure). FIG. 2(b) shows the impulse response of a filter and has F number of sampling pulses (F=3 in the figure), and FIG. 2(c) shows the result of the convolution, that is to say, FIG. 2(c) is the filter response of the input signal shown in FIG. 2(a) and has G+F−1 number of sampling pulses of (G+F−1=21+3−1=23). It should be noted from FIG. 2 that the result of the convolution has the number of sampling pulses more than the input signals by the (F−1) number of pulses, which is the number of the filter response minus one.

FIG. 3 shows the periodic convolution through discrete Fourier transform (DFT). FIG. 3(a) shows the periodic signal in which the signal in FIG. 2(a) repeats with the period of G sampling pulses, FIG. 3(b) is the periodic signal in which the signal in FIG. 2(b) repeats with the period of G sampling pulses. FIG. 3(c) is the convolution of the signals of FIG. 3(a) and FIG. 3(b). In FIG. 3(c), the portion with the hatching shows the interference portion due to the periodic signals of the signals in FIG. 3(a) and FIG. 3(b), and the other portions without hatching are the same as FIG. 2(c).

It should be noted from FIG. 3 that the processing of a non-periodic random signal shown in FIG. 2 by a filter through the discrete Fourier transform(DFT) provides an output which has an effective portion and a non-effective portion due to the effects of interference. In the embodiment, the effective portion is G−F+1=21−3+1=19, and the non-effective portion is F−1=3−1=2.

When complete filtering is desired for a random signal, two convolution circuits, each of which utilizes a DFT circuit, must be utilized and output signals of those two circuits must be connected. FIG. 4 shows that connection.

FIG. 4(a) shows the time that the input signal exists, and it should be noted that the input signal exists always as shown in the figure. As shown in FIG. 4(b), a part of said input signal is applied to the first system and is applied to the DFT circuit of the first system, in which the symbol (d) shows the delay time for the signal processing. The first system provides the output signal as shown in FIG. 4(d), after the predetermined processing time (d). Said output signal has an effective portion and a non-effective portion due to interference as mentioned above. A similar discussion is possible for the second system; the input signal is shown in FIG. 4(c) and the output signal is shown in FIG. 4(e). By connecting those two output signals (FIG. 4(d) and FIG. 4(e)), the complete output signal shown in FIG. 4(f) is obtained, in which (I) and (II) show the outputs from the system 1 and the system 2, respectively.

FIG. 1 shows the block-diagram of a prior sampling frequency reduction apparatus which utilizes a Fourier transform in accordance with the above conditions. In FIG. 1, the reference numeral 1 is the input terminal. The band-width of the input signal applied to the input terminal 1 is restricted to $f_B(H_z)$ and said input signal is sampled at the sampling frequency $2f_B(H_z)$, and the input signal is in the form shown in FIG. 2(a). 2 and 3 are the discrete Fourier transform circuits for carrying out the discrete Fourier transform (DFT) with the unit of G number of sampling pulses, 4 and 5 are multiplexers, 6 is a memory having G sampling values which are obtained by sampling the impulse response h(t) of the F samples of the filter with the sampling frequency $2f_B$, and performing G point discrete Fourier transform. Said memory can be implemented by the combination of a battery and a potentiometer since said G sampling values are fixed for a predetermined filter. 7 and 8 are inverse discrete Fourier transform circuits (IDFT) each of which performs G points inverse Fourier transform. 9 is a switch for alternately providing the outputs of the circuits 7 and 8, 10 is the circuits for thinning out the pulses for deriving a single pulse from the continuous N pulses, and 11 is an output terminal. Between G and F, the relationship G>2F must be satisfied. In FIG. 1, the portions (I) and (II) surrounded by a dotted line show the first system and the second system, respectively.

Nextly, at the operation of FIG. 1, the input of the thin out circuit 10 is mentioned below in accordance with FIG. 4. As described before, the signal at the terminal 1 has the duration time as shown in FIG. 4(a). Of the signal in FIG. 4(a), the portion shown in FIG. 4(b) is processed by the DFT circuit 2, and the portion shown in FIG. 4(c) is processed by the DFT circuit 3.

The output signal processed by the DFT circuit 2 is further processed by being multiplied by the response of the filter in the multiplexer 4, and is processed by the inverse discrete Fourier transform circuit (IDFT) 7, and the output signal of the circuit 7 is obtained with some delay time for the signal processing. The duration time of said output signal of the IDFT circuit 7 is shown in FIG. 4(d). And said output signal has an effective output and a non-effective output due to the interference mentioned in accordance with FIG. 2 and FIG. 3. Also, the signal processed by the other DFT circuit 3 is provided from the output of the IDFT circuit 8 with some delay time and, the duration time of which is shown in FIG. 4(e). The switch 9 derives only the effective portions of the two systems, and the output of the switch 9 is shown in FIG. 4(f). The control signal for control of the operation of the switch 9 appears at the instant of input signal end delayed by aforementioned processing period, as apparent from FIG. 4(f).

Now, it is assumed that the apparatus in FIG. 1 is utilized for deriving an output signal having the band-width $f_B/N$ from the frequency division signal (FDM) having the band-width $f_B$, where N is an integer and is the same as the number of multiplexed channels of a FDM system. In this case, the transfer function which is applied to the multiplyers 4 and 5 from the memory 6 has the characteristics of bandpass filter with the band-width $f_B/N$. Accordingly, the output of the switch 9 has a sampling frequency $f_B$ and a bandwidth less than $f_B/N$. By the way, it should be noted that the sampling frequency for the signal of the bandwidth less than $f_B/N$ can be only $2f_B/N$ from the well-known sampling theory. Accordingly, in view of the sampling frequency, the output signal of the switch 9 has too many samples. The thin out circuit 10 thins out the samples for every N samples and provides signal sampled at frequency of $2f_B/N$ which corresponds to the signal with the band-width $f_B/N$.

In other words, the thin out circuit 10 re-samples the fine sampled input signal to provide the coarse sampled output signal.

However, the prior circuit shown in FIG. 1 has the disadvantage that it must process too many sampled signals. In other words, although the G points IDFT circuits 7 and 8 provide G outputs, respectively, only G/N of them are actually utilized in the successive circuit. Therefore, when the value N is large, the unnecessary process or calculation in the IDFT circuits must be extravagant.

SUMMARY OF THE INVENTION

It is an object of the present invention, therefore, to overcome the disadvantages and limitations of a prior apparatus for reducing a sampling frequency by providing a new and improved apparatus for reducing a sampling frequency.

Another object of the present invention is to provide such an apparatus which is simple in structure and is fast in operation time by deleting the unnecessary calculations.

The above and other objects are attained by an apparatus for reducing the sampling frequency which derives the information with a bandwidth up to $f_B/N$ having a sampling frequency $2f_B/N$ (N is an integer), from an input FDM signal with a bandwidth up to $f_B$ having a sampling frequency $2f_B$, comprising a pair of partial frequency reduction systems and a switch for alternately selecting the outputs of said partial frequency reduction systems to provide the output signal. Each of said partial frequency reduction systems comprises DFT means for performing the discrete Fourier transform for every G sampling points (G is the multiple of N) to said input signal, a multiplication means for multiplying the predetermined frequency characteristics to the output of said DFT means, linear conversion means for linear conversion of the output of said multiplication means and for providing G/N number of data, and means for performing the inverse discrete Fourier transform to the output of said linear conversion means.

BRIEF DESCRIPTION OF THE DRAWINGS

The foregoing and other objects, features, and attendant advantages of the present invention will be appreciated as the same become better understood by means of the following description and the accompanying drawings wherein.

DESCRIPTION OF THE PREFERRED EMBODIMENTS

In the following explanation, it is assumed that the input signal has the bandwidth $f_B$, and information having the bandwidth $f_B/N$ is derived from the input signal. In this case, in order to reduce the sampling frequency, the bandwidth of the signal must be restricted by a filter, and the output of the filter must be frequency-shifted to a lower frequency. That is to say, a frequency conversion is necessary. The frequency conversion can be implemented by applying the shift theorem of the discrete Fourier transform when the band-restricted signal has no component in the negative frequency area.

The above theory is described in "The Fast Fourier Transform (E Oran Brigham, Prentice Hall, page 124)."

In order to perform the frequency conversion through said shift theorem, the filter for restricting the bandwidth must have characteristics which have no component in the negative frequency area. In this case, since the impulse response of the filter for band restriction is a complex signal, the output signal of the multiplyer is also a complex signal. And by deriving only the real part of the complex signal, a real signal having the same spectrum as that of the complex signal is obtained.

When the lower end of the desired bandwidth is zero frequency (direct current), neither frequency conversion nor the above consideration are necessary. It is assumed in the following description that the lower end of the desired bandwidth is not direct current, and thus, the frequency conversion is necessary.

Figure 5:
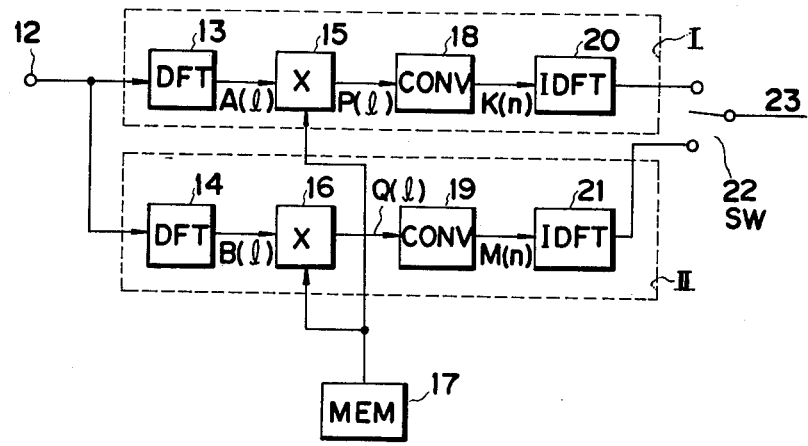
FIG. 5 is the block-diagram of the apparatus for reducing the sampling frequency according to the present invention.

FIG. 5 shows the block-diagram of the apparatus for reducing a sampling frequency according to the present invention. In the figure, the input terminal 12 receives the input signal which has a bandwidth less then $f_B$ and is sampled at the sampling frequency $2f_B$. The spectrum of the input signal is shown in FIG. 6(a). 13 and 14 are a discrete Fourier transform circuit(DFT) which performs the discrete Fourier transform for every G sampling signals. The outputs of the circuits 13 and 14 are denoted as A(l) and B(l), respectively where l=0,1,2,,, G−1. 17 is a memory circuit for storing G number of values H(0),H(1),H(2),H(3),H(4) , , , H(G−1), which are obtained by sampling the impulse response h(t) of the filter for the reduction of the sampling freqeuncy with the sampling frequency $2f_B$, and performing G point discrete Fourier transforms. The complex filters H(0)∼H(G−1) stored in the memory circuit are assumed to have the characteristics shown in FIG. 6(b). 15 and 16 are means for multiplication and frequency shift, and provide the outputs P(l) and Q(l), respectively, where P(l) and Q(l) are defined as follows.

$$P(l) = A[(l+S)_{modulo\ G}] \cdot H[(l+S)_{modulo\ G}] \quad (1)$$

$$Q(l) = B[(l+S)_{modulo\ G}] \cdot H[(l+S)_{modulo\ G}] \quad (2)$$

Where the notation $(l+S)_{modulo\ G}$ represents the modulo G of the value (l+S). That is to say, said notation $(l+S)_{modulo\ G}$ is the remainder when (l+S) is divided by G. S is a positive constant depending upon the shift frequency Δf, and the following formula is satisfied between Δf and S.

$$\Delta f = \frac{2f_B \cdot S}{G}$$

FIG. 6(c) shows P(l) and Q(l) in case of no frequency shift, and the formulae below are satisfied.

$$P(l) = A(l) \cdot H(l)$$

$$Q(l) = B(l) \cdot H(l)$$

FIG. 6(d) shows P(l) and/or Q(l) in case of both multiplication and frequency shif Δf being performed. Accordingly, the spectrum shown in FIG. 6(c) does not actually exist, and the frequency function having the spectrum shown in FIG. 6(d) is provided at the outputs 15 and 16 as P(l) and Q(l).

18 and 19 are linear conversion circuits for producing the new G/N number of values K(n), M(n) from the inputs of P(l), Q(l), where l=0 , , , G−1, in accordance with the following formulae. The value G/N is an integer in the present invention, but that condition does not restrict the application of the present invention. In the following formulae, the value n is an integer ranging from 0 to (G/N−1, and K(n) and M(n) are expressed as follows.

$$K(n) = \sum_{l=0}^{N-1} P\left(\frac{G}{N} l + n\right)$$

$$M(n) = \sum_{l=0}^{N-1} G\left(\frac{G}{N} l + n\right)$$

The spectrum of K(n) and/or M(n) is shown in FIG. 6(e), which shows that an operation equivalent to the thin out on the time axis is performed on the frequency axis. The theory of that operation is mathematically described below.

The value k(m), (m=0 , , , G/N−1), which is the inverse discrete Fourier transform for G/N sampling points of K(n) is expressed as follows.

$$k(m) = \sum_{i=0}^{\frac{G}{N}-1} K(i) \cdot W_1^{m \cdot i}$$

$$= \sum_{i=0}^{\frac{G}{N}-1} W_1^{m \cdot i} \sum_{l=0}^{N-1} P\left(\frac{G}{N} l + i\right)$$

By substituting q=(G/N)l+i the following equation is obtained.

$$k(m) = \sum_{q=0}^{G-1} W^{m(q\frac{G}{N} \cdot l)} \cdot P(q)$$

Figure 1:
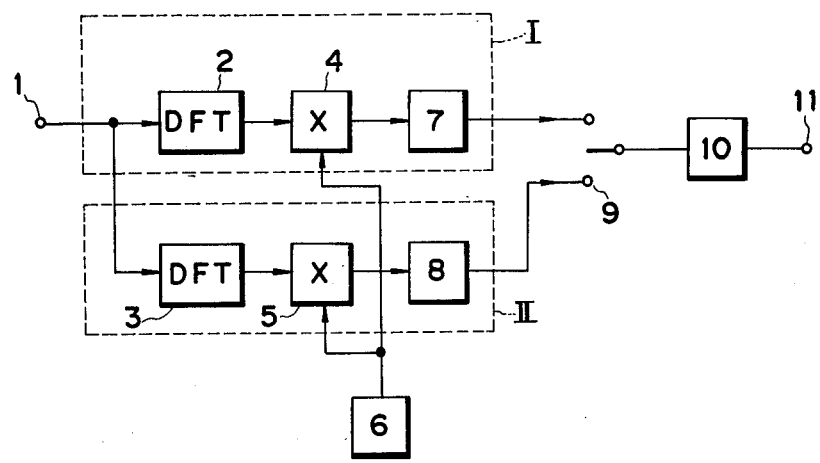
FIG. 1 is the block-diagram of the prior apparatus for reducing a sampling frequency.
Figure 2:
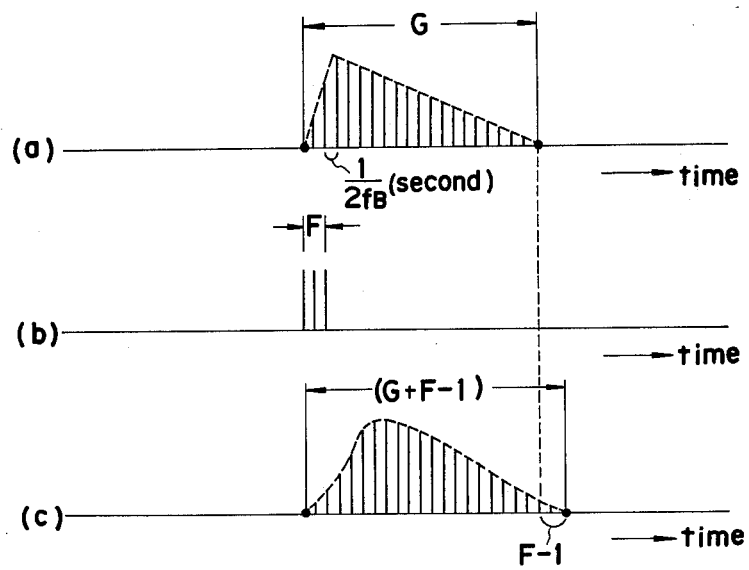
FIG. 2 is the explanatory drawing for general explanation of the convolution.
Figure 3:
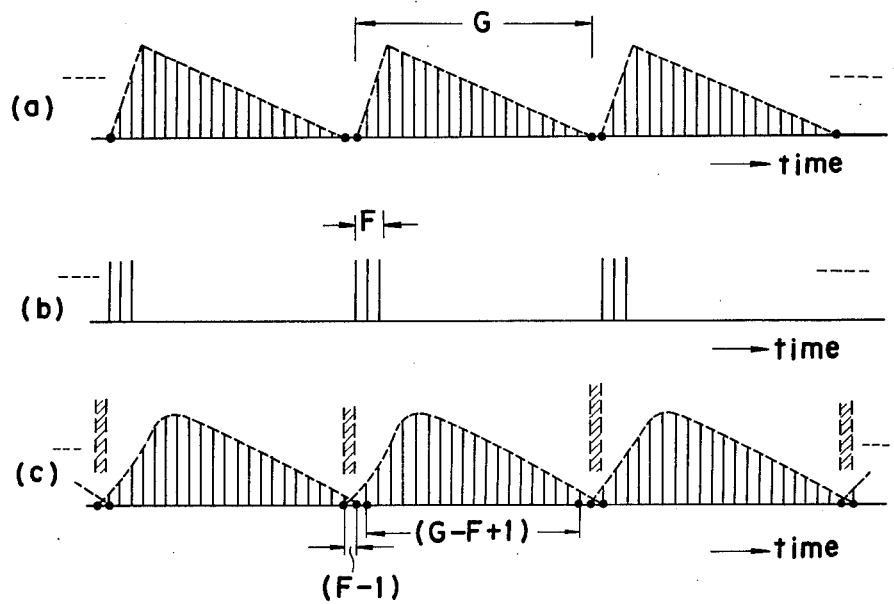
FIG. 3 is the explanatory drawing of periodic convolution utilizing a discrete Fourier transform (DFT)
Figure 4:
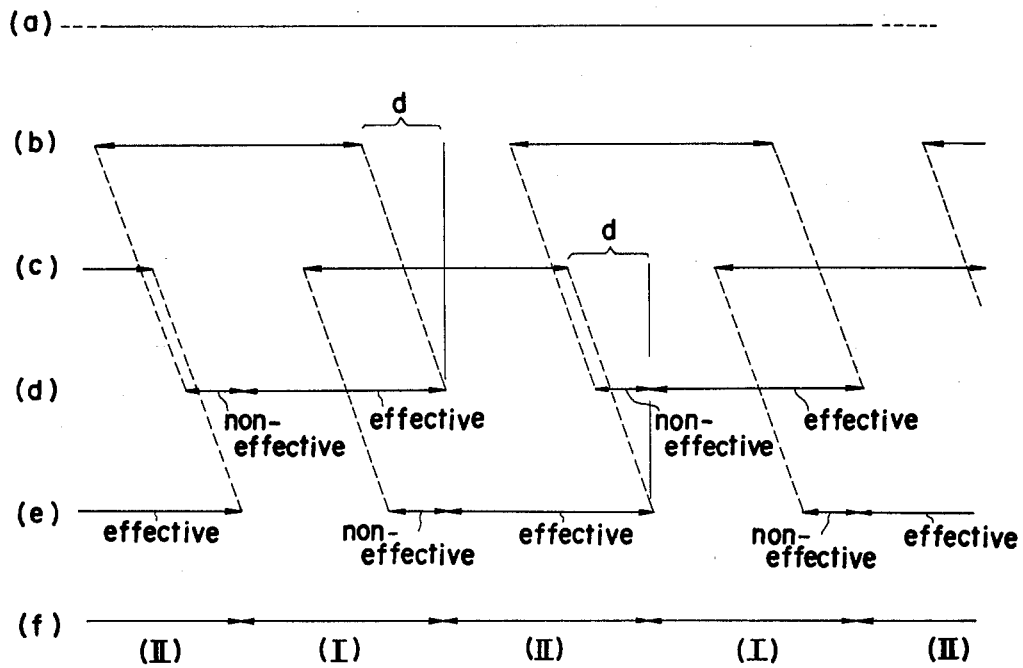
FIG. 4 is the operational time chart showing the alternate operation of two systems.
Figure 6:
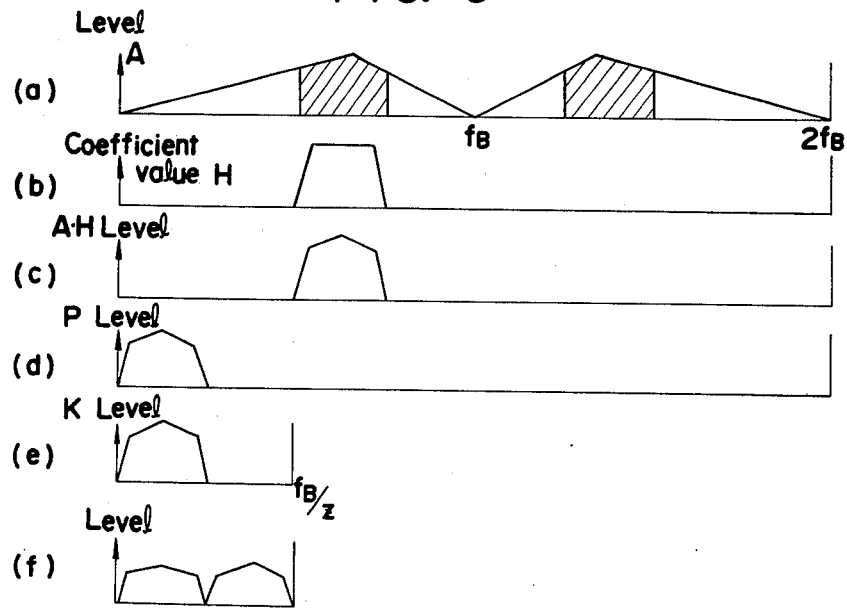
FIG. 6 shows the spectrum for explanation of the operation of the apparatus in FIG. 5.

Since $W_1 = (W_2)^N$, and $(W_2)^G = 1$ are satisfied, the formulae below are satisfied.

$$W_1 = \exp\left(\frac{2\pi J}{\frac{G}{N}}\right)$$

$$W_2 = \exp\left(\frac{2\pi J}{G}\right) \quad \text{J is the imaginary number unit}$$

$$k(m) = \sum_{q=0}^{G-1} W_2^{mNq} \cdot W_2^{-mN \cdot \frac{G}{N} l} P(q)$$

$$= \sum_{q=0}^{G-1} W_2^{mNq} \cdot P(q)$$

k(m) is the (mN)'th value of the results obtained by performing G points inverse discrete Fourier transform on p(q). That is to say, the value obtaind by applying G/N sample inverse discrete Fourier transform (IDFT) on K(n) is equal to the value obtained by applying firstly G sample inverse discrete Fourier transform (IDFT) on p(q) and secondly picking one sample for every N samples of the IDFT results. A similar discussion is possible for M(n). Accordingly, it is now clear that the value obtained by applying G/N points inverse discrete Fourier transform(IDFT), is the thinned out signal after frequency shift by Δf of the signal with the spectrum shown in FIG. 6(c). The reference numerals 20 and 21 in FIG. 5 are the circuits for inverse discrete Fourier transformer (IDFT) of the outputs signal K(n) and M(n) of the circuits 18 and 19, respectively. And 22 is the switching circuit for alternately providing the effective signals from the outputs of the circuits 20 and 21. The control of the switch 22 is the same as that described in accordance with FIG. 4. 23 is the output terminal providing the signal in which the sampling frequency is reduced, and said output signal is the signal shown in FIG. 6(e) converted to the time axis. By deriving only the real part of the output signal, the desired signal is provided. The spectrum of that desired signal is shown in FIG. 6(f). Although FIG. 6 shows the embodiment in case of N=4, the value of N can be an arbitrary integer, and further, a similar operation is possible when no frequency shift is necessary.

Next, each hardware circuit shown in FIG. 5 will be described in detail.

Figure 7:
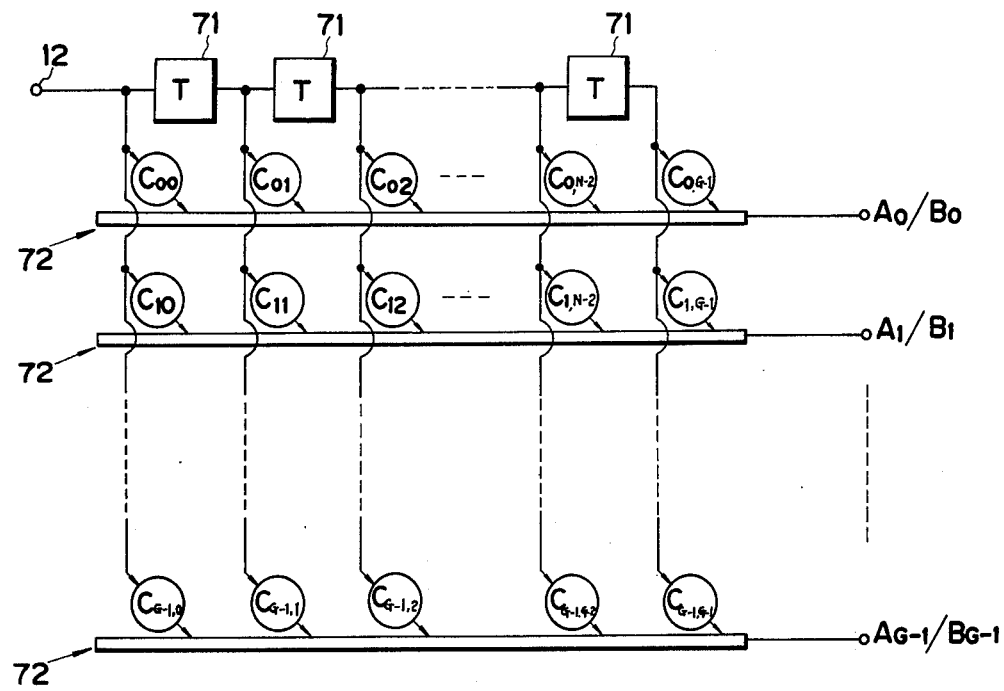
FIG. 7 is the block-diagram of the discrete Fourier transform circuit according to the present invention.

FIG. 7 shows the details of G points discrete Fourier transform circuit (DFT), denoted 13 and 14 in FIG. 5. In FIG. 7, the reference numeral 12 is the input terminal for receiving the input signal. 71 is the delay circuit with a delay time of $1/f_B$ seconds, and 72 is an adder for providing the sum of the delayed input signals to the delay circuits through coefficient multipliers $C_{a,b}$. The coefficient multiplier $C_{a,b}$ ($a=0$ , , , $G-1$, and $b=0$ , , , $G-1$) provides the product by multiplying the coefficient $$(e^{-\frac{j2\pi}{G}}) a \times b$$

and the input signal. The points $A_0, A_1, , , A_{G-1}$ provide the values $A(0), A(1) , , , A(G-1)$, respectively, as the outputs of the G points DFT circuit 13. Also, the points $B_0, B_1 , , , B_{G-1}$ provides the values $B(0), B(1) , , , B(G-1)$, respectively, as the outputs of the G points DFT circuit 14.

Figure 8:
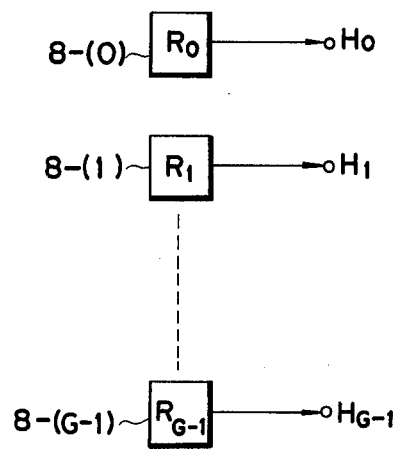
FIG. 8 shows the basic construction of a memory circuit.

FIG. 8 shows the configuration of the memory circuit 17, and the reference symbols $8-(0)$, through $8-(G-1)$ are memory elements, each of which stores the values $H(0)$ through $H(G-1)$, respectively. Said memory element can be implemented by, for instance, a combination of a battery and a potentiometer to provide a predetermined analog voltage. The output points $H_0$ through $H_{G-1}$ provide the values $H(0)$ through $H(G-1)$, respectively.

Figure 9:
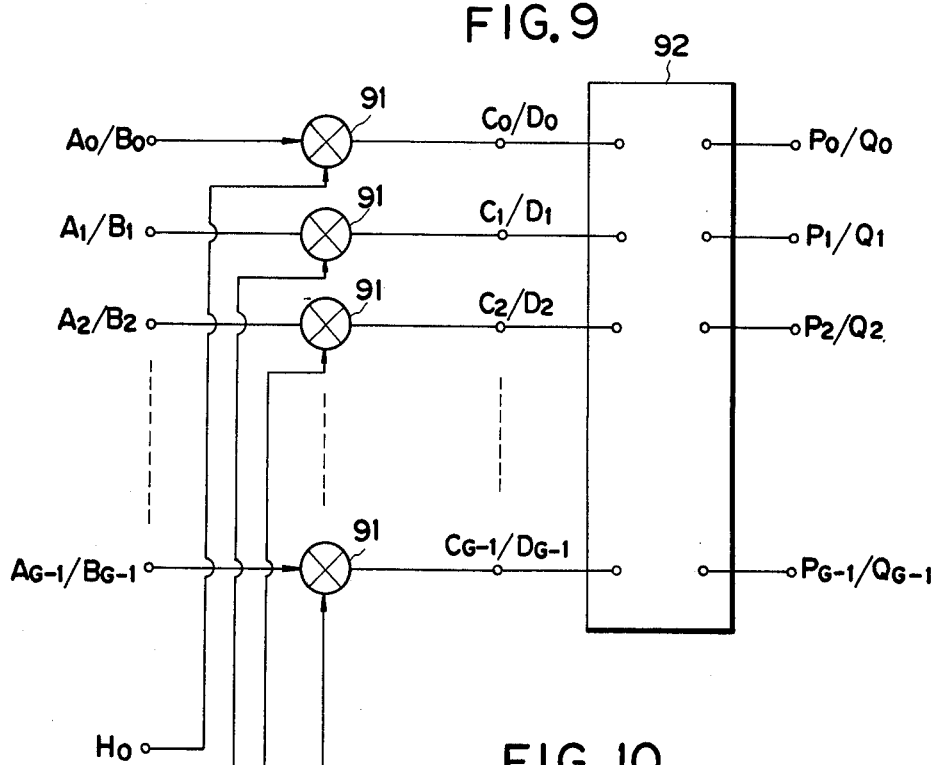
FIG. 9 is the embodiment of the circuit for performing the multiplication and the frequency shift.

FIG. 9 shows the circuit 15 and/or 16 in FIG. 5 for performing the multiplication and frequency shift. In FIG. 9, the points $A_l$ and/or $B_l$ ($l=0$ , , , $G-1$) are connected to the outputs of the circuits 13 and/or 14, which is the G points discrete Fourier transform (DFT) circuit, and is shown in detail in FIG. 6. The points $H_l$, ($l=0$ , , , $G-1$) are the outputs of the memory circuits 17 which provides $H(l)$ and is described in accordance with FIG. 8. The reference numeral 91 in FIG. 9 is a multiplyer, which provides the product of the signals $A(l)$ and/or $B(l)$ at the points of $A_l$ and/or $B_l$, and the signals $H(l)$ at the points of $H_l$. The output of the multiplyer is provided at the points $C_l$ or the points $D_l$. 92 is the frequency shift circuit in which the point $C_l$ or the point $D_l$ is connected to the point $P_{(l-S) modulo\ G}$ or the point $R_{(l-S) modulo\ G}$ by a connection wire (not shown), where S is an integer and is given in accordance with the formula (1) or (2). Apparently, no calculation means is provided in the frequency shift circuit 92. Further, each point $C_l$ of $D_l$ corresponds to a single point $P_l$ or $Q_l$, thus, no point $P_l$ or $Q_l$ receives more than two wires from the points $C_l$ or $D_l$, and no non-connected point $P_l$ or $Q_l$ to the input wire exists. The outputs of the circuits 15 and/or 16 for multiplication and frequency shift are $P_l$ and/or $Q_l$, ($l=0$ , , , $G-1$), and those outputs provide the values $P(l)$ and/or $Q(l)$ defined by the formulae (1) and (2). Thus, the circuits 15 and/or 16 as a whole perform the calculation of the formulae (1) and/or (2).

Figure 10:
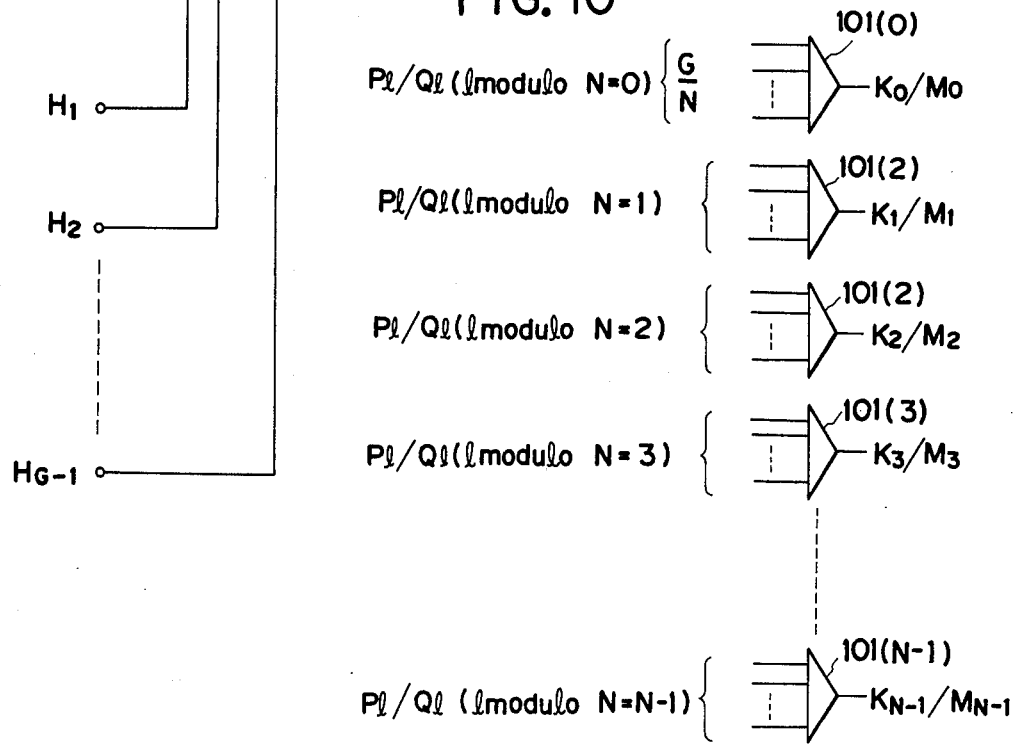
FIG. 10 is the embodiment of the circuit for the linear transform.

FIG. 10 is the detailed block-diagram of the linear conversion circuit 18 or 19. The calculation means of the linear conversion circuit is an adder 101(0) through 101(N−1), each of which has N number of G/N inputs and a single output.

Each adder 101(i) has G/N number of inputs, which receive all the values $P_l$ and $Q_l$ with the (l)$_{modulo\ N}$ being i, and said adder provides the sum of all the inputs. Among G/N number of inputs of the adder 101(i), a single input is provided from $P_i$ or $Q_i$, as apparent from the above condition. Those inputs of adders are the outputs $P_l$ and $Q_l$ ($l=1$ , , , $G-1$) of the multiplicators 15 and 16 in FIG. 5, and the outputs of the adders are $K_n$ or $M_n$ ($n=0$ , , , $N-1$). $K_n$ or $M_n$ is the output defined by the formula (3) or (4).

Figure 11:
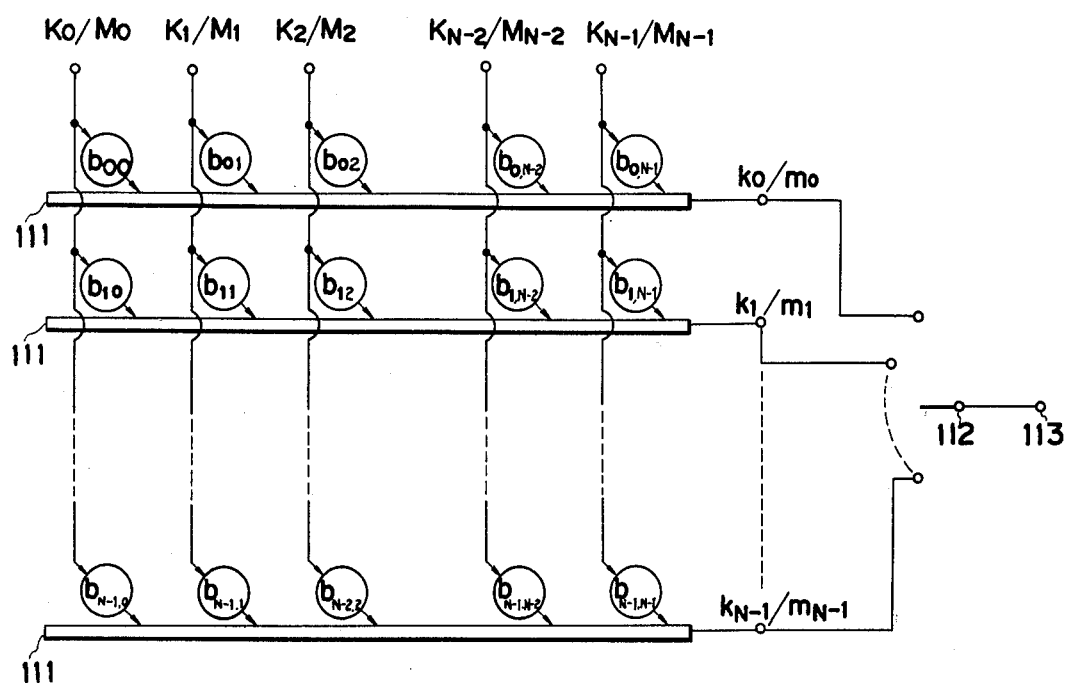
FIG. 11 is the block-diagram of the inverse discrete Fourier transform circuit (IDFT).

FIG. 11 shows the detailed block-diagram of the circuits 20 and 21. The inputs of the device of FIG. 11 are connected to the outputs $K_n$ of $M_n$($n=0$ , , , $N-1$) of the linear conversion circuit. In FIG. 11, the symbol $b_{a,b}$ ($a=0$ , , , $N-1$, and $b=0$ , , , $N-1$) shows the coefficient multiplicator, which multiplies the coefficient $$(e^{j\frac{2\pi}{G/N}}) a \times b$$

by the values $K_n$ or $M_n$. The numeral 111 shows the adder which has N number of inputs and a single output. At the point $k_m$ in the matrix of FIG. 11, the time function $k(m)$ ($m=0$ , , , $N-1$) as defined by the formula (5) is provided. Those time function signals are converted to serial form signals by the scanner 112 which slides for every $2/(Nf_B)$ seconds, and the converted serial form signals are applied to the switch circuit 22. 113 is the output point of the scanner 112.

As described in detail, according to the present invention, the amount of data is reduced to G/N of the original amount by processing the data through a G points discrete Fourier transform (DFT) with the sampling frequency $2f_B$, the multiplier for multiplying the filter characteristics by the output of said DFT circuit, and the linear conversion circuit. And next, the output of the linear conversion circuit is processed by the G/N points inverse discrete Fourier transform (IDFT) circuit with the sampling frequency $2(f_B/N)$. The above circuits are provided with two systems, and the outputs of the IDFT circuits of each system are alternately selected by a switch. Accordingly, the number of sampled values of the inputs of the IDFT circuits is smaller than those of a prior art, and then the number of multiplication operations in a unit time can be reduced. Since the number of multiplications is the important factor in a digital signal processing system, the present invention can provide simple structure of an apparatus.

It should be appreciated that the present invention is applicable not only to the demodulation of the frequency division modulation(FDM) signal, but also other systems. For instance, the present invention can be applied to a circuit for reducing the sampling frequency in a zoom circuit for a partial resolution improvement in a frequency analyzer.

From the foregoing it will now be apparent that a new and improved apparatus for reducing the sampling frequency has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An apparatus for reducing a sampling frequency which derives information with a bandwidth up to $f_B/N$ having the sampling frequency $2f_{B/N}$, (N is an integer), from an input signal with a bandwidth up to $f_B$ having the sampling frequency $2f_B$, comprising; a pair of partial frequency reduction systems and a switch for alternately selecting the outputs of said partial frequency reduction systems to provide the output signal, each of said partial frequency reduction systems having DFT means for performing on G points the discrete Fourier transform (G is a multiple of N) of said input signal, a multiplication means for multiplying the predetermined frequency characteristics with the output of said DFT means, linear conversion means for linear conversion of the output of said multiplication means and for providing G/N number of data, and means for performing the inverse discrete Fourier transform to the output of said linear conversion means.

2. The invention as defined in claim 1, wherein said linear conversion means for the linear conversion of the output of the multiplication means and for providing G/N number of data, comprises N number of adders each of which has G/N number of inputs.

* * * * *